Aug. 5, 1958  H. A. GATTUSO  2,845,859
FEEDING AND REGISTERING MECHANISM
Filed April 19, 1956  4 Sheets-Sheet 1

INVENTOR
Henry A. Gattuso
BY
Paris and Haskell
atty.

Aug. 5, 1958
H. A. GATTUSO
2,845,859
FEEDING AND REGISTERING MECHANISM
Filed April 19, 1956
4 Sheets-Sheet 2
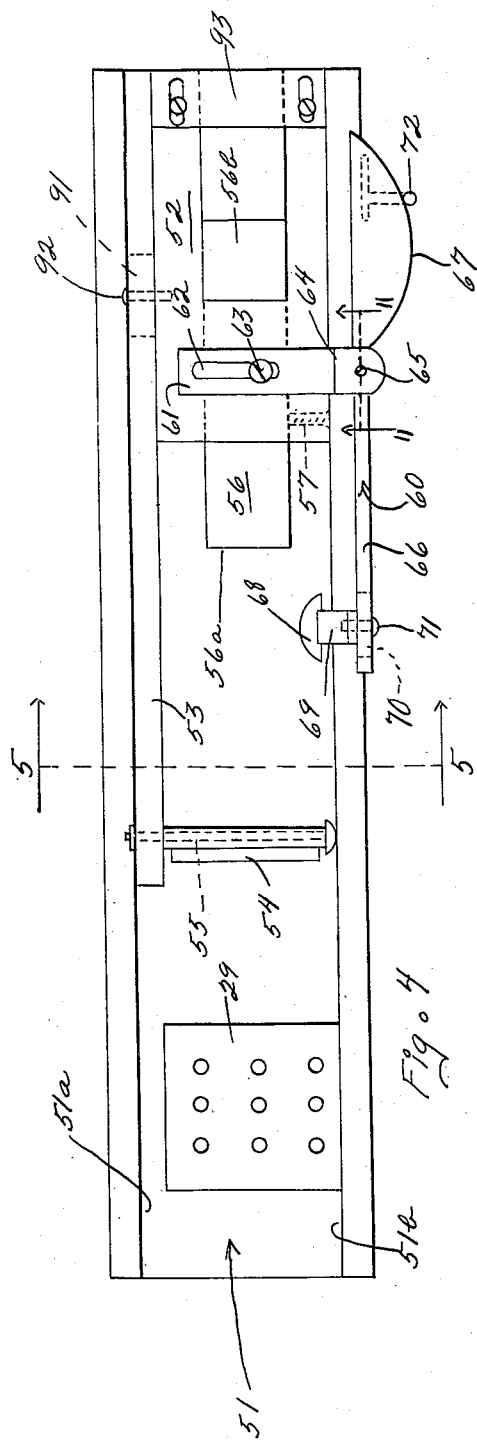
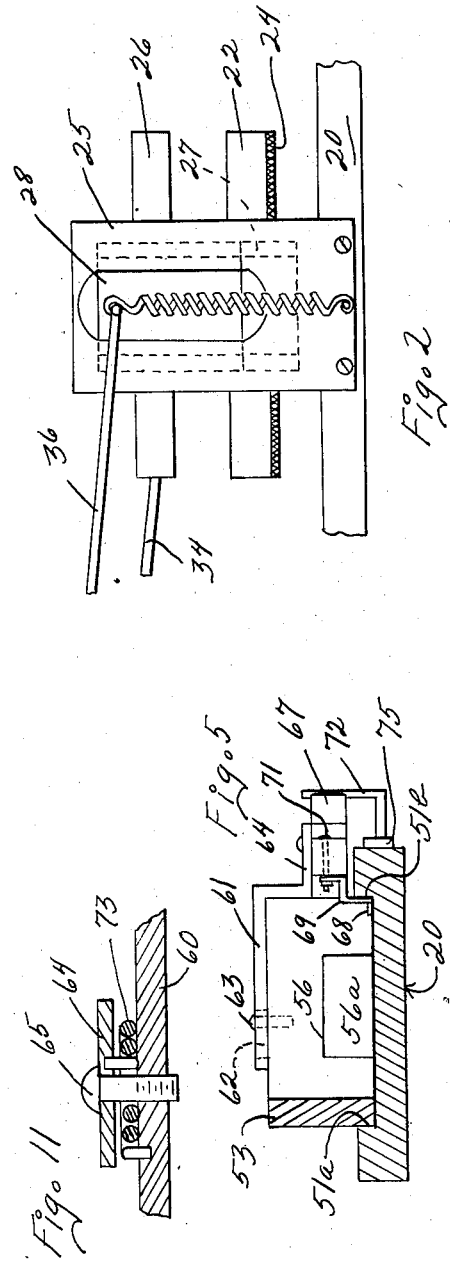
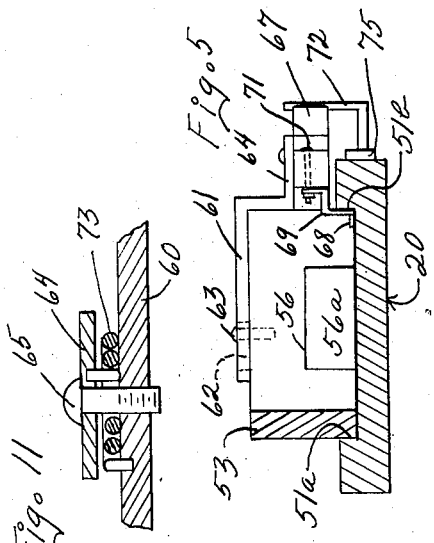
INVENTOR
Henry A. Gattuso
BY
Paris and Haskell
atty.

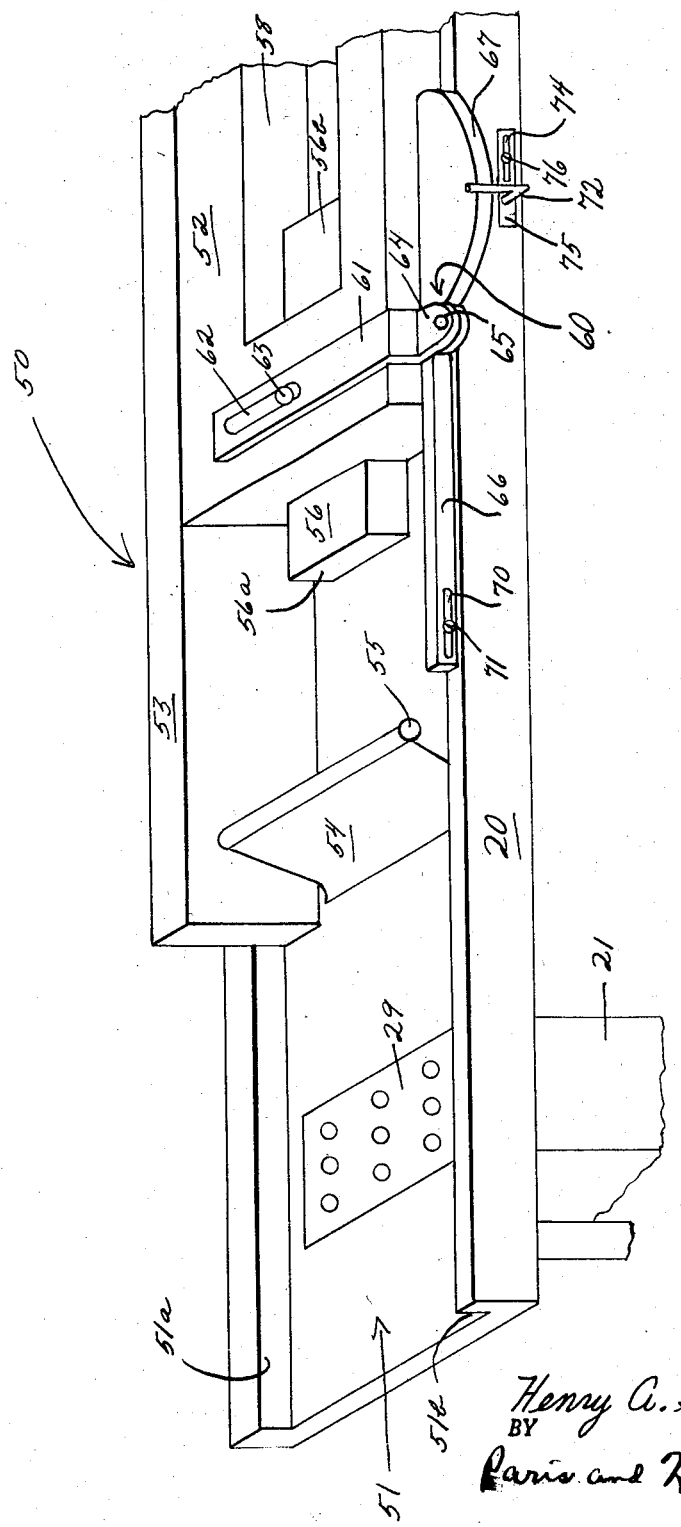

Aug. 5, 1958 H. A. GATTUSO 2,845,859
FEEDING AND REGISTERING MECHANISM
Filed April 19, 1956 4 Sheets-Sheet 4
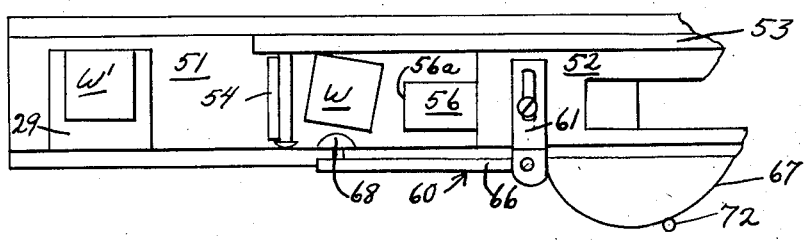
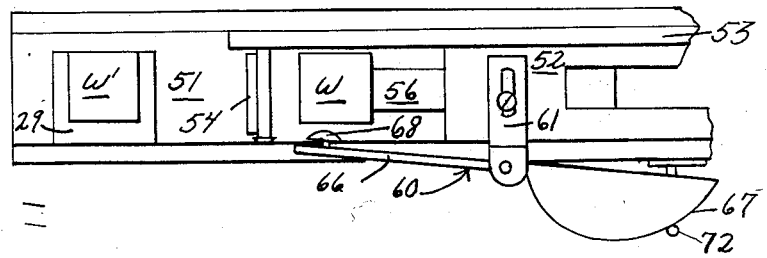
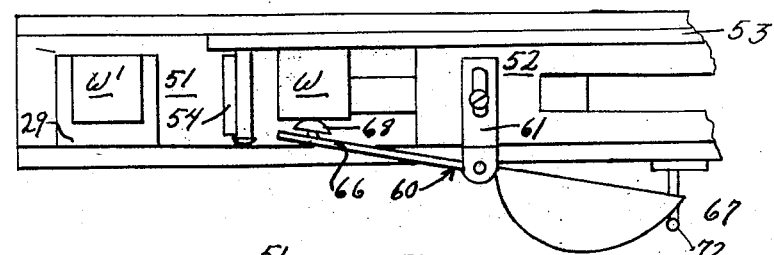
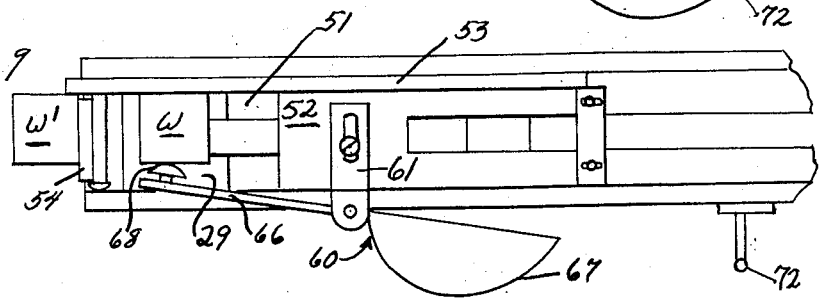
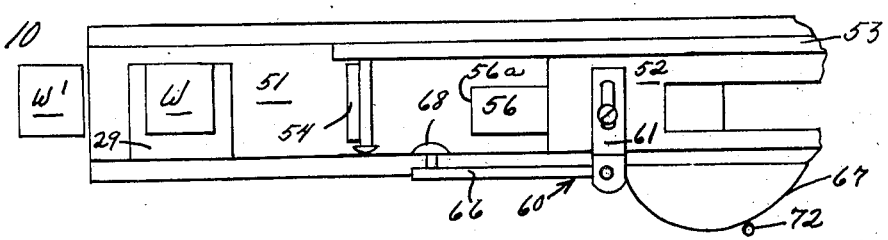
INVENTOR
Henry A. Gattuso
BY
Paris and Haskell
atty.

United States Patent Office 2,845,859
Patented Aug. 5, 1958

2,845,859

FEEDING AND REGISTERING MECHANISM

Henry A. Gattuso, Adams, Mass.

Application April 19, 1956, Serial No. 579,342

9 Claims. (Cl. 101—126)

The present invention is a continuation in part of my copending application Serial No. 332,325, filed January 21, 1953, now U. S. Patent No. 2,747,502. Said prior application relates generally to automatic screen or stencil printing machines, and in part is directed to a novel work registering mechanism adapted to position work pieces fed to the machine accurately on the platen, so that printings will be uniformly applied to successive work pieces, and successive printings on the same work piece will be accurately registered. The present invention constitutes a novel improvement of the registering mechanism of said prior application. Although the registering mechanisms of both the said prior and the present applications are generally applicable to many types of machines and operations where it is desired to accurately position work pieces in an area where work is to be performed thereon, it is contemplated that the principal field of utility will be found in printing or stenciling machines of the type shown and described in said prior applications; wherefore, said application is incorporated herein by reference. To facilitate a complete appreciation of the significance of the present invention, the basic screen printing machine of the prior application and its operation will hereinafter be schematically described.

One difficulty in the general application of automatic screen or stencil printing to precision or multi-impression work has been the problem of obtaining consistent registration of the work pieces to be printed. This problem has particularly manifested itself in the application of screen printing to the manufacture of printed electrical circuits and printed electrical circuit components. The compatability of electrically conductive inks or pastes with screen printing methods basically renders screen printing a highly desirable mode of production of printed circuits and components. However, due to the extreme registration tolerances required for multiple impression circuits and components, as for example, when a capacitor is formed by printing conductive areas on two sides of a dielectric base, the adaptability of screen printing to this field has been restricted. Another registration difficulty in this type of work is the lack of precision uniformity in the ceramic plates frequently employed as bases for the printed circuits and components.

Reasonable registration accuracy has been obtainable by hand positioning of the work pieces to be printed on the platens of screen printing machines. But it is apparent that this mode of operation is time consuming and inefficient. In accordance with the present invention, there is provided an automatic work piece feeding and registering apparatus which not only eliminates the necessity for hand positioning of work pieces, but also affords greater registration accuracy than can normally be obtained from hand registration.

In accordance with the present invention, there is provided a reciprocating feeding and registering mechanism which automatically advances work pieces to a work station, a platen for example in the case of a screen printing machine. By the use of a two-point reference standard provided in the reciprocating system, and a work piece locator for driving and clamping the work piece into the reference position, the present apparatus affords a reproducible and accurate location thereon of each work piece fed to the registering device. Thus, with a drive designed to reciprocate the apparatus to a definite and preestablished stroke limit, the work pieces will be precisely positioned at an established work station, such as on the platen of a screen printing machine. Additionally, the reciprocating apparatus is designed to advance or remove a previous work piece from the work station as it locates a subsequent work piece thereat.

Accordingly, it is one object of the present invention to provide a work piece feeding and registering apparatus.

Another object is to provide a reciprocating work piece feeding and registering apparatus which will accurately locate each work piece fed thereto with reference to the apparatus, and deliver the thus located work piece to an established station with precision uniformity.

Another object of the present invention is to provide a reciprocating work piece feeding and registering apparatus which affords a two point reference for positioning work pieces fed thereto, provides for orienting and clamping such work pieces in known relation to said reference points, and delivers the oriented work pieces or successive work pieces with precision reproducibility to a work station.

Still another object of the present invention is to provide a precision work feeding and registering apparatus operating in conjunction with a screen printing apparatus, affording reproducible precision orientation of a work piece or successive pieces on the platen of the printer.

Other objects and advantages of the present invention will be apparent from a consideration of the following detailed description of one exemplary embodiment of the present invention, as embodied in an automatic screen printing machine. This detailed description is had in conjunction with the accompanying drawings, in which like numerals throughout the various views refer to like or corresponding parts, and wherein:

Fig. 2 is a fragmentary back view of a portion of the machine shown in Fig. 1;

Fig. 3 is an isometric view of the feeding and registering mechanism of the present invention, isolated from the major portion of the machine of Fig. 1;

Fig. 4 is a top plan view of the feeding and registering mechanism of the present invention, isolated from the major portion of the machine of Fig. 1;

Fig. 5 is a cross-sectional view taken along line 5—5 of Fig. 4;

Figs. 6–10 are top plan views of the feeding and registering mechanism of the present invention showing the various stages of one cycle of its operation; and Fig. 11 is an enlarged detailed cross-sectional view taken along the line 11—11 of Fig. 4.

Figure 1:
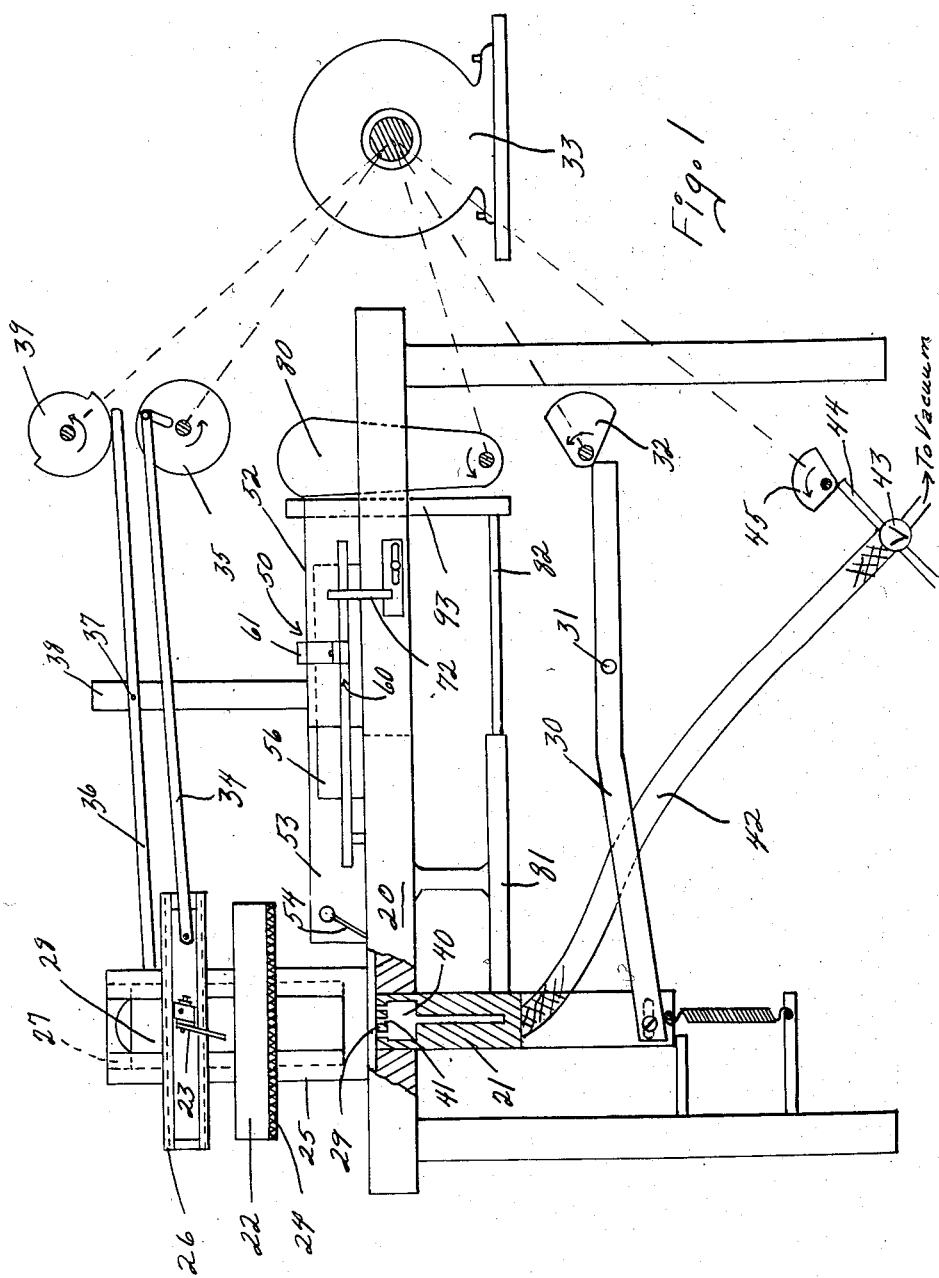
Fig. 1 is a side elevation and partially schematic view of a screen printing apparatus embodying the present work feeding and registering mechanism.

As previously stated, the instant embodiment of the present feeding and registering mechanism is shown in operative relation with an automatic screen printing apparatus of the type fully described in my above-identified copending application. For facilitating an understanding of the present invention, said printing machine and its operation are schematically shown here in Fig. 1.

Briefly, the automatic screen printing machine, with which the specific embodiment of the instant work feeding and registering mechanism is designed to operate, comprises a bed or base table 20, in which a printing platen 21 is vertically reciprocably mounted. A printing screen 24 and ink tray 22 are mounted over the platen by means of standard 25 carried by the bed 20. A squeegee assembly 23 is horizontally reciprocably mounted over and in cooperative relation with the screen 24, by means of the horizontal track guide 26. The horizontal track guide 26 is in turn vertically reciprocably mounted by means of plate 28 in the vertical track guide 27 formed in standard 25, plate 28 being slidably fitted in the trackway of standard 25. Through the horizontal and vertical mobility afforded the squeegee assembly 23 by trackway guides 26 and 27, the squeegee may be caused to wipe the stencil screen 24 in one direction of horizontal movement, then be elevated from the screen, returned in the reverse horizontal direction, and again placed in contact with the stencil screen for repeating the cycle. During the foregoing cycling of the squeegee, the platen assembly 21 is reciprocated to bring a work piece positioned on the platen surface 29 into printing engagement with the screen 24 for the screen wiping or printing stroke of the squeegee, and to remove the work piece therefrom after the printing is completed, either at the completion of the printing stroke or at some point therebefore.

In order to effect the foregoing operations automatically, the platen assembly 21 is reciprocably driven by the lever 30 pivoted at 31 and operated on by the cam 32 appropriately geared to the motor 33. The squeegee assembly 23 is horizontally reciprocated by means of the drive shaft 34, pivotally connected at one end to the squeegee assembly, and pivotally connected at its other end to the rotating drive wheel 35 appropriately geared to motor 33. At the same time, the squeegee assembly is vertically reciprocated by the lever 36, pivotally connected at one end to the plate 28, and pivotally supported intermediate its ends at 37 on the standard 38 carried by the bed 20. The lever 36 is pivoted on its support 38 by the cam 39 operating on the free end of the lever, this cam being rotated by motor 33 through appropriate gearing. The drive wheel 35 and cam 39 are so designed and positioned on their shafts that the squeegee cycles by being lowered into contact with the screen at one end of its horizontal stroke, then being driven horizontally to the other end of its horizontal stroke, whereupon it is raised away from the screen and returned to the first stated end of its horizontal stroke, and then lowered again into contact with the screen in preparation for a second stroke in contact with the screen. The horizontal stroke of the squeegee in contact with the screen is the printing stroke. Cam 32 is appropriately adjusted and positioned on its shaft so as to elevate the platen assembly and bring a work piece positioned thereon into printing engagement with the screen in appropriate relation to the printing stroke, and then to remove the work from contact with the screen.

In order to insure that a work piece once positioned on the platen 29 will be held in position, it is clamped thereon by vacuum means. For this purpose, the platen is interiorly hollowed into a vacuum chamber 40, and has a perforated work receiving surface 41. A vacuum line 42 is connected to the platen vacuum chamber, and contains a control valve 43 operated by the lever 44 and cam 45 driven by motor 33 through appropriate gearing. The cam 45 is appropriately shaped and positioned on its shaft so that it operates the valve 43 through lever 44 to apply a vacuum to the platen in synchronism with the positioning of a new work piece on the platen, and to break the vacuum following the completion of a printing operation and lowering of the platen assembly into registry with the bed, to enable removal of the printed work piece from, and positioning of a new work piece upon, the platen.

The work piece feeding and registering mechanism of the present invention is generally designated by the numeral 50, and cooperates in timed relation with the foregoing printing mechanism to feed and to register a new work piece upon the platen 29 during each cycle of the printer, and at the same time to remove each preceding printed work piece from the platen preparatory to positioning of each succeeding piece.

The work feeding and registering mechanism 50 is a unit designed to reciprocate in guide channel 51 provided in bed 20. This unit comprises a basic body block 52 to which is secured a side rail 53 extending forward of the block a substantial distance. Rail 53 is longitudinally adjustable relative to the block 52 by means of slot 91 and cooperating bolt 92. The block 52 and side rail 53 are so dimensioned that together they provide a width corresponding to the spacing between side walls 51a and 51b of channel 51, so as to provide for smooth accurate riding of the entire feeding and registration unit 50 in the channel. Adjacent the forward end of rail 53 is a plow 54, freely pivotally supported on shaft 55 carried by rail 53. Plow 54 is dimensioned to contact the bottom of channel 51, and is assembled to extend forwardly from the location of shaft 55 as it depends therefrom. By this orientation, it can be readily seen that on forward movement of the unit 50 the plow 54 will clear from channel 51 anything lying ahead of it therein, but upon return rearward movement of the unit 50, the plow will pivot freely about shaft 55 to pass over anything in the channel 51.

Housed by the body block 52 is an adjustable pusher bar 56 extending therethrough, whose forward portion 56a extends forwardly of the block 52 and engages the surface of the bottom of channel 51. The rear portion 56b of the pusher 56 extends into the fork channel 58 formed in the rear of block 52. Pusher bar 56 is set in a desired relation to block 52 as by means of a set screw 57 passing through the block and engaging a side surface of the pusher bar.

Also carried by the block 52 and forming a part of the reciprocating work feeding and registering mechanism is the pivotal work locating and clamping finger 60. The finger supporting bracket 61 is carried on the block 52, and by means of slot 62 and set screw 63 is adjustable transversely of the block. The end 64 of bracket 61 is formed to support the work locating and clamping finger 60 freely pivotable about axis 65, and substantially along the side of the block 52 but spaced therefrom. The finger 60 is formed with a rod portion 66 extending forwardly from the pivot axis 65, and reaching to the area between the plow 54 and portion 56a of the pusher bar, while the portion of the finger 60 extending rearwardly from the pivot axis 65 is formed with a cam surface 67. Depending from the forward portion of rod 66 is a bracket 69 carrying work engaging pad 68. The bracket 69 is affixed to rod 66 and is adjustable lengthwise thereof by means of slot 70 in the rod and screw 71. As seen from the drawings, the finger 60 is positioned above the side 51b of channel 51 so that it can pivot thereover with the forward end of rod 66 extending over the channel 51 and into the area between the plow and pusher. In order that the work engaging pad 68 may operate in close proximity to the surface of channel 51, the bracket 69 is shaped to depend from the rod 66 and clear the lip 51b of the channel when the pad 68 is fully retracted toward the lip 51b. A cam engaging operator 72 is carried by bed 20 to engage the cam surface 67 of finger 60 during a portion of the reciprocating movement of the assembly 50, and thus effect a desired pivoting action of finger 60 into the retracted position shown for example in Fig. 4. Cam operator 72 works on surface 67 in opposition to the force of coil spring 73 carried between and engaging by its bent ends finger 60 and portion 64 of bracket 61, as shown in Fig. 11. Looking down upon the work feeding and registering mechanism as in Fig. 4, spring 73 tends to urge the finger 60 to pivot clockwise about the pivot axis 65. The cam operator 72 is also mounted for adjustment lengthwise of the bed by means of slot 74 formed in operator mounting plate 75, and clamping screw 76.

Reciprocation of assembly 50 along the length of channel 51 is accomplished by the rotating cam 80, appropriately geared to motor 33, and acting on the cam follower 93 adjustably mounted in the fork channel of block 52, to drive the entire assembly 50 forwardly in the direction of platen 29. Rearward or return movement of the assembly 50 may be effected by a spring contained in housing 81 and acted upon by the piston 82 extending from the follower 93. As will be readily apparent to one skilled in the art, an appropriate dash pot may be provided in spring housing 81 to cushion the return or rearward stroke of assembly 50.

The sequence of operation of the work feeding and registering mechanism of the present invention is illustrated in Figs. 6–10, where the series of operations in one complete cycle of the device is shown. In this showing it is assumed that there has been at least one previous operational cycle, and a prior work piece W' is already positioned on the platen 29 and has been printed. With the assembly in the fully retracted position, the next work piece W is positioned with littel regard to orientation in the work receiving area between the back of plow 54 and the forward end 56a of the pusher bar. At this stage in the operation, it is seen that the work engaging pad 68 is fully retracted out of the work receiving area by the action of cam operator 72 on cam surface 67 of the pivotal work locating finger 60. As cam 80 rotates about its shaft, it acts on follower 93 to drive the entire assembly 50 forward toward the platen 29. The forward end 56a of the pusher bar first engages the new work piece W and tends to orient it squarely with respect to its leading surface. As forward movement of the assembly 50 continues, cam surface 67 rides over operator 72 permitting the spring 73 to pivot finger 60 and cause the work engaging pad 68 thereof to drive the work piece W against rail 53, and thus clamp the work W in squared relation to the rail and the leading surface of the pusher bar, as shown in Fig. 8. With the work W thus accurately registered with respect to two reference points, the forward work feeding movement of assembly 50 continues; whereupon, the plow 54 engages the previous work piece W' and pushes it off the platen into any desired receiving means, not shown. As the work piece W' is pushed clear of the platen, the new work piece W is positioned thereon in an exact predetermined registration, identical to that of the preceding work piece W'. The assembly 50 is then withdrawn rearwardly to the starting position of Fig. 10 in readiness to receive another work piece. In this rearward return stroke, the plow 54 is free to pass over the work piece W by pivotal movement about shaft 55, and the cam surface 67 is again caught up by operator 72. In the return stroke of assembly 50, work piece W is not disturbed from its registered position on the platen as plow 54 passes thereover, because it is clamped in position by the application of vacuum to the chamber of platen 29. It is readily apparent that a fixed or adjustable limit stop may be provided for the pivotal movement of finger 60 to insure that under all conditions the cam surface 67 will always pass inside the cam operator 72 on the return stroke. The corner of block 52 may function as such a limit stop.

Although the work piece is here shown as rectangular in contour, it is apparent that the present invention can be readily adapted to operate on any shape work piece by appropriately modifying the registration surfaces where necessary. For example, in the case of a circular work piece, the same organization can be used, except it may be desirable to provide the pad 68 with a straight work engaging surface instead of an arcuate one.

In order to accommodate the present feeding and registering apparatus to various sizes of work pieces, the apparatus is provided with several features of adjustability. First, the pusher bar 56 is adjustable longitudinally of the block 52 to enlarge, diminish or relocate the work receiving area. This adjustment feature also can be used to vary the final location of the work piece on the platen lengthwise of the channel 51. Along with the pusher bar adjustment, it becomes necessary at times to vary the plow position. This is afforded by the adjustability of rail 53 relative to block 52. It is obvious that for precision work the pad 68 should act centrally on the work pieces. Accordingly, it is made adjustable along the longitudinal axis of rod 66, so that it may both be accommodated to different sized work pieces, and be relocated in accordance with the adjusted position of pusher bar 56. The proper clamping and opening of the finger 60 on variously sized work pieces, and the proper action thereof with respect to various settings of bar 56 is accomplished by the compound adjustment of bracket 61 transversely of the block 52 and of the cam operator 72 longitudinally of the bed, the effects of which will be readily apparent to one skilled in the art.

As is apparent, the present feeding and registering mechanism may be adapted to provide feeding of work pieces to and precision registration thereof at a work station for the performance of any desired operation upon the work, and such is within the purview of the present invention. However, when used in conjunction with the above-described printing machine, the cycling of the printing aspects of the machine are related to the cycling of the feeding and registering mechanism as follows: Following the removal from the platen of a prior work piece and the positioning thereon of the next one, vacuum is applied interiorly of the platen to clamp the registered work against disturbance by the plow as it is retracted over the registered work, and this vacuum is maintained until the printing operation is complete. After the assembly 50 has been retracted clear of the platen, the platen is elevated to bring the registered work into printing engagement with the screen, and the squeegee effects a printing stroke over the screen. During this time, a new work piece is received by the assembly 50. The platen assembly is then lowered and the work clamping vacuum therein is broken. Whereupon, the work feeding and registering assembly moves forward to clear the printed work piece from the platen and position the next work piece thereon.

The foregoing exemplary specific embodiment is presented merely by way of example to facilitate an understanding of the present invention, and it is not intended that the scope of the invention be limited to the specific details of this embodiment. Various modifications of the embodiment and of the invention within the spirit and scope of the appended claims will be apparent to those skilled in the art, and such are considered to be embraced by the claims.

I claim:
1. A work registering mechanism comprising: a bed having a guide means thereon; a work positioning and feeding assembly reciprocably carried as a unit by said bed and guided by said guide means; said assembly comprising a work engaging and pushing means providing a first work orienting reference point, a second work engaging means cooperating with said pushing means providing a second work orienting reference point located relative to said first reference point to define a two point reference system for reproducibly orienting a work piece relative to said assembly, and a work locating and clamping means carried by said assembly for reciprocating travel therewith and cooperating with said pushing means and second work engaging means for locating a work piece randomly positioned in a work receiving area adjacent said pushing and second engaging means into registration engagement with said two reference points and there clamping the work piece relative to said assembly, said locating and clamping means being movable on said assembly between a retracted work receiving position and an advanced work clamping position; means for reciprocating said assembly between a work receiving and a work delivering point; and means at said work receiving point for camming and holding said locating and clamping means in retracted work receiving position upon movement of said assembly to said work receiving point and releasing the same upon movement of said assembly from said work receiving point toward said work delivering point; whereby a work piece randomly oriented at the work receiving point is reproducibly oriented and registered at said work delivering point.

2. A work registering mechanism as set forth in claim 1, wherein said assembly reciprocating means includes means for reproducibly and adjustably defining the extent of travel of said assembly in the direction of said work delivering point.

3. A work registering mechanism as set forth in claim 1, and further including means in said assembly positioned in advance of said work receiving area for clearing a previously delivered work piece from said work delivering point during the succeeding assembly reciprocation cycle.

4. A work registering mechanism as set forth in claim 1, and further including work retaining means at said work delivering point for retaining the work piece in delivered orientation after release thereof by said assembly.

5. A work registration mechanism as set forth in claim 1 and: wherein said assembly reciprocating means includes means for reproducibly and adjustably defining the extent of travel of said assembly in the direction of said work delivering point; said mechanism further includes means in said assembly positioned in advance of said work receiving area for clearing a previously delivered work piece from said work delivering point during the succeeding assembly reciprocation cycle; and work retaining means at said work delivering point for retaining the work piece in delivered registration after release thereof by said assembly.

6. A printing machine comprising a bed, a platen, a printing means, said platen being reciprocably mounted on said bed for movement between a work receiving position flush with said bed and a position in printing relation with said printing means, a work feeding and registering assembly reciprocably carried and guided by said bed between a work receiving point and a work delivering point adjacent said platen, said assembly including means adapted to cooperate with a work piece for defining a reproducible orientation of the work piece relative to said assembly, work locating and clamping means carried by said assembly and movable relative thereto for driving a work piece randomly positioned in a work receiving area adjacent said orientation defining means into orienting engagement with said orientation means and for clamping the work piece in oriented relation with said orientation means, means for opening said clamping means when said assembly is at said work receiving point and for closing said clamping means when said assembly is moved from said work receiving point toward said work delivering point, means for releasing said work piece from said clamping means when said assembly is at said work delivering point and holding said work piece in delivered position on said platen, means for reciprocating said assembly and said platen and operating said printing means, said last mentioned means including means for synchronizing said reciprocations and printing means operation so that said platen is in work receiving position when said assembly is driven thereto and remains in work receiving position until said assembly is retracted therefrom, and said printing means performs a printing operation when said platen is moved to printing relation with said printing means.

7. A printing machine as defined in claim 6, and further including means carried by said assembly in advance of said work receiving area for clearing a previous work piece from the platen on the succeeding reciprocation cycle of said assembly, and said synchronizing means also causing release of said work piece platen holding means upon arrival of said clearing means at the platen during movement of said assembly toward said work delivering point.

8. A work registering mechanism comprising a bed, a work positioning and feeding assembly reciprocably guided over said bed between a work receiving point and a work delivering point, said assembly including means adapted to cooperate with a work piece for defining a reproducible orientation of the work piece relative to said assembly, work locating and clamping means carried by said assembly for reciprocating travel therewith and movable relative thereto for driving a work piece randomly positioned in a work receiving area adjacent said orientation defining means into orienting engagement with said orientation means and for clamping the work piece in oriented relation with said orientation means during movement of said assembly to said work delivering point, means at said work receiving point for camming and holding said clamping means open upon movement of said assembly to said work receiving point and releasing said clamping means upon movement of said assembly from said work receiving point toward said work delivering point, and means for releasing said work piece from said clamping means when said assembly is at said work delivering point, whereby a work piece randomly oriented at the work receiving point is reproducibly oriented and registered at said work delivering point.

9. A work registering mechanism for orienting reproducibly a work piece and moving the same over a surface to a delivery point in a desired orientation, comprising an assembly adapted to be reciprocably guided over said surface between a work receiving point and a work delivering point, said assembly including means adapted to cooperate with a work piece for defining a reproducible orientation of the work piece relative to said assembly, work locating and clamping means carried by said assembly for reciprocating travel therewith and movable relative thereto for driving a work piece randomly positioned in a work receiving area adjacent said orientation defining means into orienting engagement with said orientation means and for clamping the work piece in oriented relation with said orientation means during movement of said assembly to said work delivering point, and means at said work receiving point for opening and holding said clamping means open upon movement of said assembly to said work receiving point and releasing said clamping means upon movement of said assembly from said work receiving point toward said work delivering point, whereby a work piece randomly oriented at the work receiving point is reproducibly oriented and registered at said work delivering point.

References Cited in the file of this patent

UNITED STATES PATENTS

| | | |
|---|---|---|
| 2,211,661 | Krell | Apr. 13, 1940 |
| 2,297,730 | Turnock et al. | Oct. 6, 1942 |
| 2,335,670 | Harvey | Nov. 30, 1943 |
| 2,451,388 | Hawes | Oct. 12, 1948 |
| 2,650,696 | Gedris | Sept. 1, 1953 |
| 2,785,792 | Cordis | Mar. 19, 1957 |